(12) United States Patent
Ariyama

(10) Patent No.: US 6,590,975 B1
(45) Date of Patent: Jul. 8, 2003

(54) ECHO CANCELLER

(75) Inventor: Yoshihiro Ariyama, Tokyo (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/408,952

(22) Filed: Sep. 30, 1999

(30) Foreign Application Priority Data

Sep. 30, 1998 (JP) .......................................... 10-277089

(51) Int. Cl.[7] .............................. H04M 9/08; H04B 3/23
(52) U.S. Cl. .............................. 379/406.09; 379/406.08; 370/290
(58) Field of Search ........................... 379/402, 406.01, 379/406.05, 406.08, 406.09, 390.02, 390.04, 417; 381/66, 94.1, 94.2, 94.3; 370/289, 290, 291; 375/344, 345, 346, 350, 351

(56) References Cited

U.S. PATENT DOCUMENTS

| | | | | |
|---|---|---|---|---|
| 4,896,318 A | * | 1/1990 | Kokubo et al. ............. | 370/32.1 |
| 5,018,134 A | * | 5/1991 | Kokubo et al. ............. | 370/32.1 |
| 5,790,440 A | * | 8/1998 | Fujii et al. .............. | 364/724.19 |
| 6,185,300 B1 | * | 2/2001 | Romeburg .................. | 379/410 |
| 6,185,301 B1 | * | 2/2001 | Muraoka .................... | 379/410 |
| 6,201,866 B1 | * | 3/2001 | Ariyama et al. ............ | 379/410 |
| 6,236,725 B1 | * | 5/2001 | Takada et al. ............. | 379/406 |
| 6,351,532 B1 | * | 2/2002 | Takada et al. ......... | 379/406.01 |

OTHER PUBLICATIONS

"Outline of Adaptive Filter," Yutaka Kaneda, Journal of the Acoustical Society of Japan, vol. 48, No. 7, pp. 489–492, 1992.

* cited by examiner

Primary Examiner—Binh Tieu
(74) Attorney, Agent, or Firm—Venable LLP; Michael A. Sartori

(57) ABSTRACT

An echo canceller having an adaptive algorithm for canceling an echo signal comprises an adaptive filter, a renewal controller and an initial operation controller. The adaptive filter generates a pseudo echo signal by renewing tap coefficients based on a far-end input signal, a near-end input signal and a residual signal, the renewal controller determines a time average of a renewal amount for each tap coefficients and estimates an initial delay of the echo signal by detecting the time average indicating a maximum renewal amount. The initial operation controller operates the adaptive filter to perform an initial operation to eliminate the tap coefficients corresponding to the initial delay of the echo signal and to renew the remaining tap coefficients corresponding to the echo signal.

16 Claims, 5 Drawing Sheets

IMPULSE RESPONSE ON THE ECHO PATH

ECHO CANCELLER

BACKGROUND OF THE INVENTION

1. Field of the Invention

This invention relates generally to an echo canceller, and more specifically, it relates to an echo canceller used with an adaptive filter.

2. Description of the Background Art

An echo canceller may be used with, for example, a hands free telephone, a TV conference communication system and so on in order to cancel echo signals produced by sound coupling. The echo canceller applies an adaptive algorithm to cope flexibly with a change in an echo path and external noises. Examples of such an adaptive algorithm are a least-mean-squares (LMS) algorithm and a normalized least-mean-squares (NLMS) algorithm, which are described in "Outline of Adaptive Filter," Journal of the Acoustical Society of Japan, Vol. 48, No. 7, Pages 489–492 (1992). These adaptive algorithms are used in the adaptive filter of the echo canceller because the amount of renewal (i.e., adaptive) calculations are relatively small and the renewal operations are stable.

In general, a longer echo path necessitates more tap coefficients for the adaptive filter. For this reason, the adaptive filter must calculate a large number of tap coefficients and have a large memory for the renewal calculations. Furthermore, a larger initial delay for the echo path necessitates more required calculations for the adaptive filter. This problem occurs in spite of the type of adaptive algorithms used.

To overcome this problem, a techniques has been suggested for reducing the amount of the renewal calculations by eliminating some tap coefficients corresponding to the initial delay based on a characteristic of an impulse response of the echo path. To eliminate the tap coefficients corresponding to the initial delay, it is necessary to measure the initial delay of the impulse response. However, for mobile radio communication system, it is difficult to measure correctly the initial delay because the initial delay is always changing.

SUMMARY OF THE INVENTION

Therefore, it is an object of the present invention to provide an echo canceller for reducing the amount of the renewal calculation by eliminating some tap coefficients corresponding to the initial delay based on a characteristic of an impulse response on the echo path. That is, to measure the initial delay, an echo canceller having an adaptive algorithm for canceling an echo signal comprises an adaptive filter, a renewal controller and an initial operation controller. The adaptive filter generates a pseudo-echo signal by renewing tap coefficients, based on a far-end input signal, a near-end input signal and a residual signal. The renewal controller determines a time average of a renewal amount for each tap coefficient and estimates an initial delay of the echo signal by detecting the time average indicating a maximum renewal amount. The initial operation controller operates the adaptive filter to perform an initial operation to eliminate the tap coefficients corresponding to the initial delay and to renew the remaining tap coefficients corresponding to the echo signal, when power of the far-end input signal higher than a predetermined first threshold level and power of the near-end input signal is lower than a predetermined second threshold level. Accordingly, the adaptive filter generates the pseudo-echo signal based on the remaining tap coefficients.

BRIEF DESCRIPTION OF THE DRAWINGS

These and other objects and features of the present invention will become more apparent from consideration of the following detailed description taken in conjunction with the accompanying drawing in which.

DESCRIPTION OF THE PREFERED EMBODIMENT

A. First Embodiment of the Invention

Figure 1:
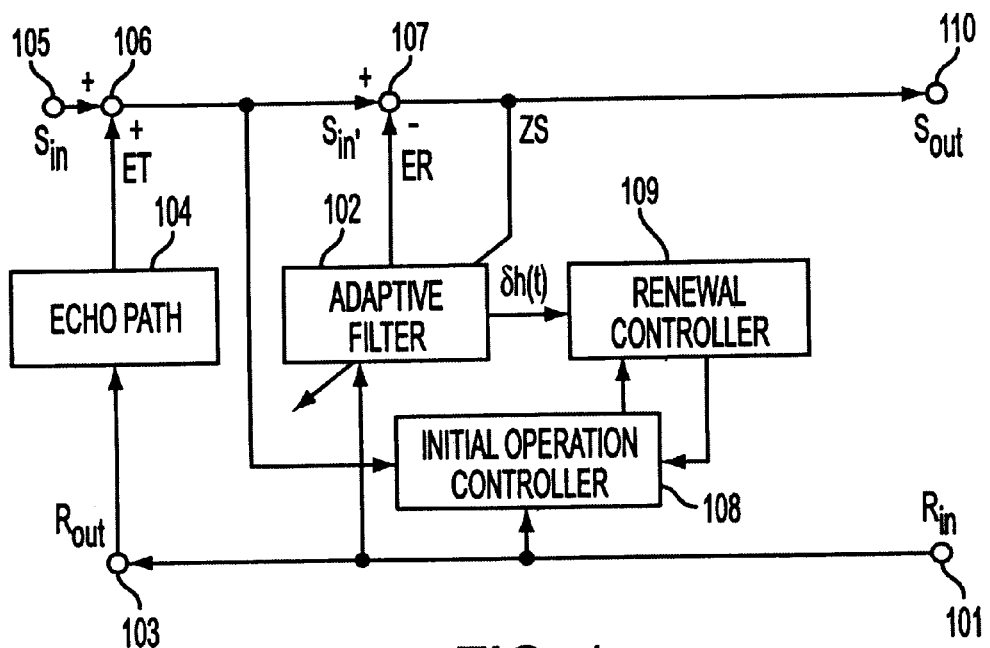
FIG. 1 is a block diagram showing an echo canceller according to a first embodiment of the invention.

FIG. 1 shows an echo canceller according to a first embodiment of the invention. The echo canceller includes a far-end input terminal 101, an adaptive filter 102, a near-end output terminal 103, an echo path 104, a near-end sound source 105, a near-end input terminal 106, an adder 107, an initial operation controller 108, a renewal controller 109 and a far-end output terminal 110. A normalized least-mean squares algorithm is used in the echo canceller as the adaptive algorithm.

A far-end input signal (Rin) input at the far-end input terminal 101 is output to the near-end output terminal 103 and is provided to the adaptive filter 102. A near-end output signal (Rout) output from the near-end output terminal 103 is provided to the near-end input terminal 106 via the echo path 104 as an echo signal (ET). The echo signal (ET) is forced to be included with a near end input signal (Sin) generated by the near-end sound soutce 105 at the near-end input terminal 106. That is, the near-end input signal (Sin) becomes a near-end signal (Sin') by adding the echo signal (ET).

The adaptive filter 102 performs an echo cancel operation for removing the echo signal (ET) from the near-end signal (Sin') to obtain the near-end input signal (Sin). Here, in order to reduce the amount of the renewal calculations of tap cofficients by eliminating some tap coefficients corresponding to an initial delay of an impulse response, it is necessary to detect the initial delay. In this case, the adaptive filter 102 detects the initial delay by utilizing a renewal amount of tap coefficients that is relatively small during the initial delay. Accordingly, the adaptive filter 102 detects the initial delay based on the renewal amount of tap coefficients and performs the echo cancel operation using an actual impulse response except for the initial delay of the impulse response for the echo signal. Thus, the echo canceller performs (1) an initial operation for detecting the initial delay and (2) the echo cancel operation for removing the echo signal (ET) from the near-end signal (Sin') as discussed next.

(1) Initial Operation

Figure 3:
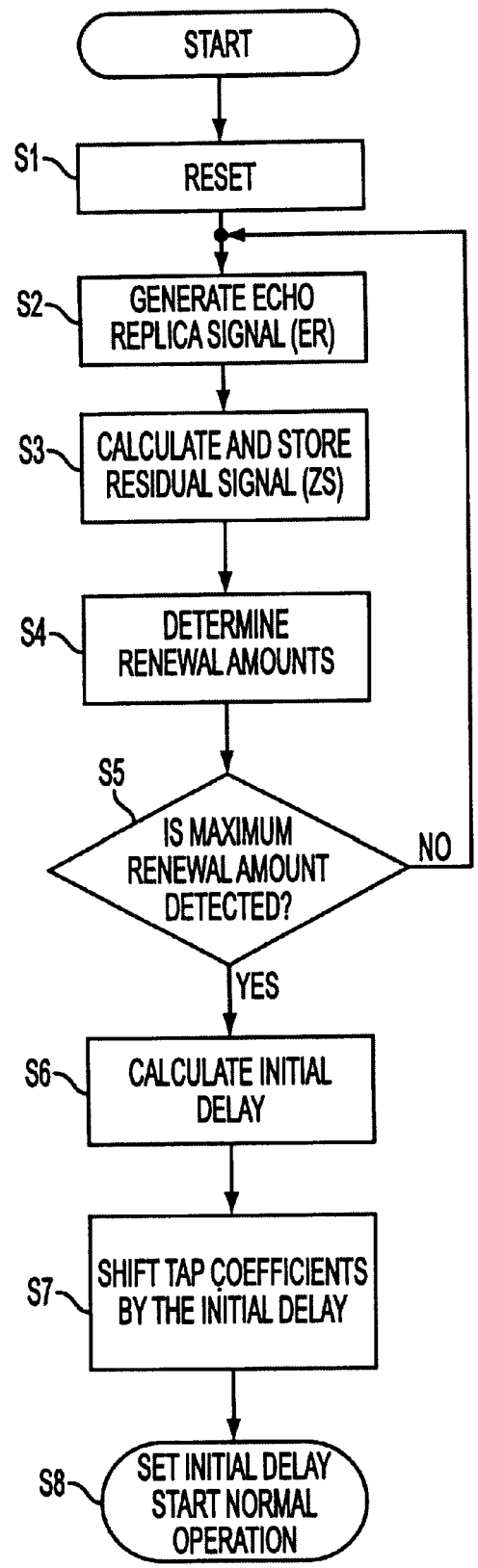
FIG. 3 is a flow chart showing an initial operation of the echo canceller according to the first embodiment of the invention.

FIG. 3 is a flow chart showing the initial operation of the echo canceller according to the first embodiment. The initial operation controller 108 receives the far-end input signal (Rin) and the near-end signal (Sin') and then starts the initial operation based on a predetermined criterion. Here, the predetermined criterion is, for example, that an average energy of the near-end signal (Sin') is lower than a first threshold level, and an average energy of the far-end input signals (Rin) is higher than a second threshold level. Where, the first level is, for example, −45 dBm0, and the second threshold level is, for example, −45 dBm0, if this echo canceller is used with a telephone set as a hands-free function.

First, the adaptive filter 102 resets tap coefficients and the amount of an initial delay of an impulse response (STEP S1). The adaptive filter 102 generates an echo replica signal (ER) based on the tap coefficients h(t) at time t and the far-end input signal (Rin) (Step S2). The echo replica signal (ER) is calculated by the following equation (1).

$$ER = h(t)^T X(t) \qquad (1)$$

where $h(t)^T = [h_1(t), h_2(t), \ldots h_N(t)]$, the superscript "T" indicates the transpose operation, X(t) is a discrete-time series of N previous far-end input signals (Rin) from time t and N is a positive integer.

The adder 107 subtracts the echo replica signal (ER) from the near-end signal (Sin'(=y(t))). That is, a residual signal (ZS(=e(t))) is calculated by using the following equation (2), and the residual signal (ZS) is stored in the adaptive filter 102 (STEP S3).

$$e(t) = y(t) - h(t)^T X(t) \qquad (2)$$

The adaptive filter 102 renews tap coefficients based on the residual signal (ZS) such that the amplitude of the residual signal (ZS) is zero. The adaptive filter 102 also measures each renewal amount of the tap coefficients (STEP S4). The renewal operation of the tap coefficients is performed based on the following equation (3).

$$h(t+1) = h(t) + \alpha e(t) X(t) / (X(t)^T X(t) + \beta) \qquad (3)$$

where $\alpha$ is a step size ($0 < \alpha < 2$) and $\beta$ is a small positive number to avoid zero-division.

Also, the renewal amount ($\delta h(t)$) of the tap coefficients is calculated based on the following equation (4).

$$\delta h(t) = \alpha e(t) X(t) / (X(t)^T X(t) + \beta) \qquad (4)$$

The renewal amount ($\delta h(t)$) is provided to the renewal controller 109 from the adaptive filter 102. The renewal controller 109 observes each renewal amount of the tap coefficients and determines a time average for each renewal amount of the tap coefficients by summing previous renewal amounts and a current renewal amount (STEP S5).

The time average for each renewal amount is calulated using the following equation (5).

$$\delta h_k(t) = 1/m \sum_{r=0}^{m} \delta h_k(t-r)^2 \qquad (5)$$

where $1 \leq k \leq N$ and m is an integer number of samples used to compute the time average.

Using the calculated time averages for the renewal amounts, the renewal controller 109 selects the tap coefficient ($h_n(t)$) having a maximum renewal amount from among all tap coefficients. Alternatively, instead of calculating time averages for renewal amounts, the maximum renewal amount can be determined by comparing the current and previous renewal amounts. If the time averages do not exceed a predetermined threshold level, the steps S2 to S2 are repeatedly performed.

The renewal controller 109 then concludes that the tap coefficients between $h_1(t)$ and $h_{n-1}(t)$ correspond to the initial delay. The reason for this conclusion as to the initial delay is explained next with reference to FIG. 2.

Figure 2:
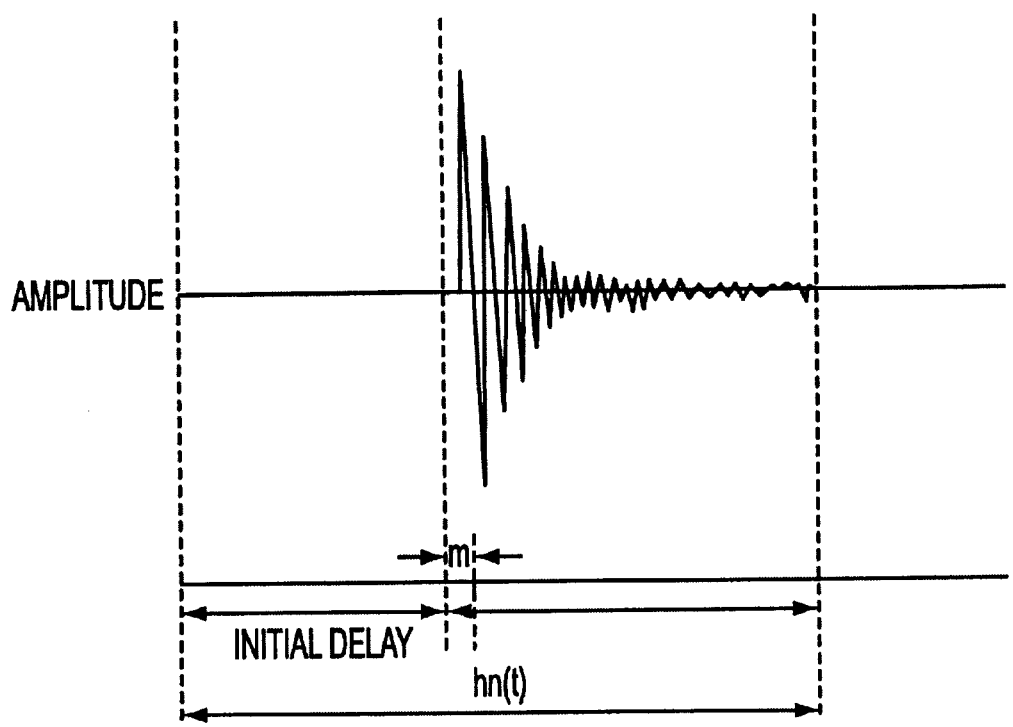
FIG. 2 is a graph showing a relationship between an impulse response of an echo path and an initial delay.

FIG. 2 shows a relationship between the impulse response and the initial delay. The impulse response of the echo path has the following features: (1) a vary small amplitude during the initial delay; (2) a maximum amplitude appearing after the initial delay; and (3) an amplitude exponentially attenuating after maximum amplitude. In this case, the renewal amount of the tap coefficient becomes a maximum value at the maximum amplitude of the impulse response. For this reason, the renewal controller 109 can conclude that the tap coefficients between $h_1(t)$ and $h_{n-1}(t)$ correspond to the initial delay. In other wards, the renewal controller 109 can detect the amount of the initial delay of the impulse response based on the tap coefficient having the maximum renewal amount.

The renewal controller 109 provides the amount (n−1) of the initial delay to the initial operation controller 108. The initial operation controller 108 subtracts a margin (m) from the amount (n−1) of the initial delay and controls an operation of the adaptive filter 102 based on the amount (n−m−1) of the initial delay (STEP S6). Here, the margin (m) is an integer and is predetermined using simulation or experiments to decrease any error in detecting the initial delay such that the amount (n−m−1) corresponds to a reliable initial delay.

The adaptive filter 102 eliminates tap coefficients corresponding to the amount (n−m−1) of the initial delay provided by the initial operation controller 108. The remaining tap coefficients greater than (n−m−1) are shifted by the amount (n−m−1) of the initial delay in response to the elimination of the tap coefficients (STEP S7). In other wards, the tap coefficient $h_1(t)$ is replaced with the tap coefficient $h_{n-m}(t)$, the tap coefficient $h_2(t)$ is replaced with the tap coefficient $h_{n-m+1}(t)$, and so on until tap coefficient $h_{N-(n-m-1)}(t)$ is replaced with the tap coefficient $h_N(t)$. The remaining tap coefficients $h_k(t)$ for $(N-(n-m-1)+1) \geq k \geq N$ are not replaced, and the adaptive filter 102 operates using a reduced number N−(n−m−1) of tap coefficients.

After determining the amount (n−m−1) of the initial delay, the adaptive filter 102 performs a normal operation (STEP S8).

(2) Normal Operation

The adaptive filter 102 calculates and generates the echo replica signal (ER) based on the tap coefficients h(t) of the impulse response at time t and the far-end input signal (Rin). Suppose that the amount of the initial delay is d=n−m−1, the adaptive filter 102 calculates the echo replica signal (ER) without using the tap coefficients corresponding to the amount of the initial delay d. Thus, the echo replica signal (ER) is calculated based on the following equation (6).

$$ER = h(t)^T X(t-d) \qquad (6)$$

where X(t) is a discrete-time series of N previous far-end input signals (Rin) from time t, N is a positive integer and d(=n−m−1) is the amount of the initial delay.

The residual signal (ZS=e(t)) is generated by subtracting the echo replica signal (ER) from the near-end input signal (Sin'(=y(t))) as in the following equation (7).

$$e(t)=y(t)-h(t)^T X(t-d) \quad (7)$$

The adaptive filter 102 renews the tap coefficients based on the residual signal (ZS). The renewal operation of the tap coefficients is performed based on the following equation (8).

$$h(t+1)=h(t)+\alpha e(t)X(t)/(X(t-d)^T X(t-d)+\beta) \quad (8)$$

where $\alpha$ is a step size (0<$\alpha$<2), $\beta$ is a small positive number to avoid zero-division and d is the amount of the initial delay.

Thus, the residual signal (ER) is output from the far-end output terminal 110 as a far-end output signal (Sout).

The adaptive filter repeatedly performs the above-mentioned normal operation for every near-end input signal (Sin) as a one cycle operation. If the initial operation controller 108 detects a change in the amount of the initial delay, the adaptive filter 102 performs the initial operation prior to performing another normal operation.

According to the first embodiment of the invention, the amount of the initial delay is determined based on the change in the renewal amount of the tap coefficients. Specifically, the discrete-time point proceeding the discrete-time point for the maximum renewal amount of the tap coefficients is the initial delay. Hence, the echo canceller according to the first embodiment can detect the amount of the initial delay correctly. In addition, the adaptive filter 102 does not need to calculate the tap coefficients corresponding to the initial delay.

Alternatively, the eliminated tap coefficients (n−m−1) corresponding to the initial delay can be used and are assigned values corresponding to an end portion of the impulse response such that all N tap coefficients of the adaptive filter 102 are used.

B. Second Embodiment of the Invention

Figure 4:
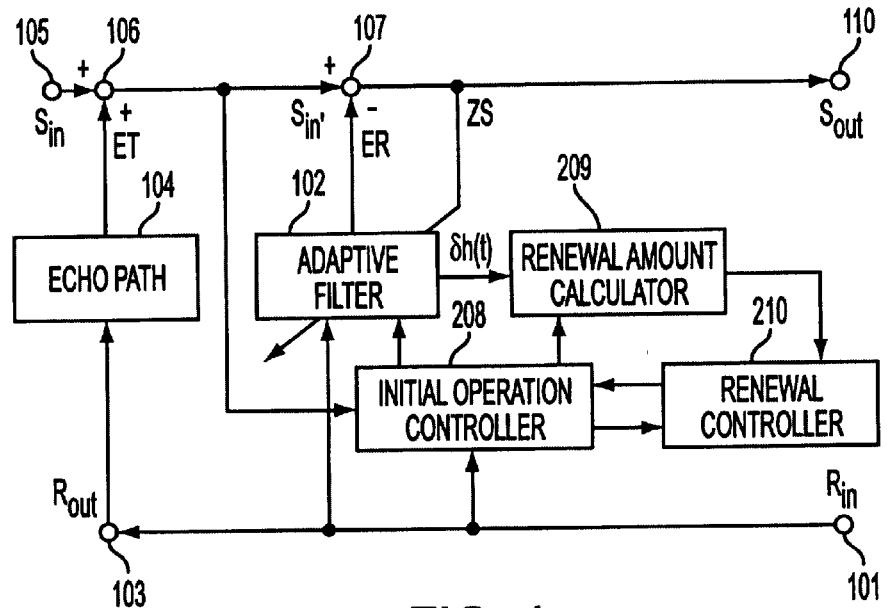
FIG. 4 is a block diagram showing an echo canceller according to a second embodiment of the invention.
Figure 5:
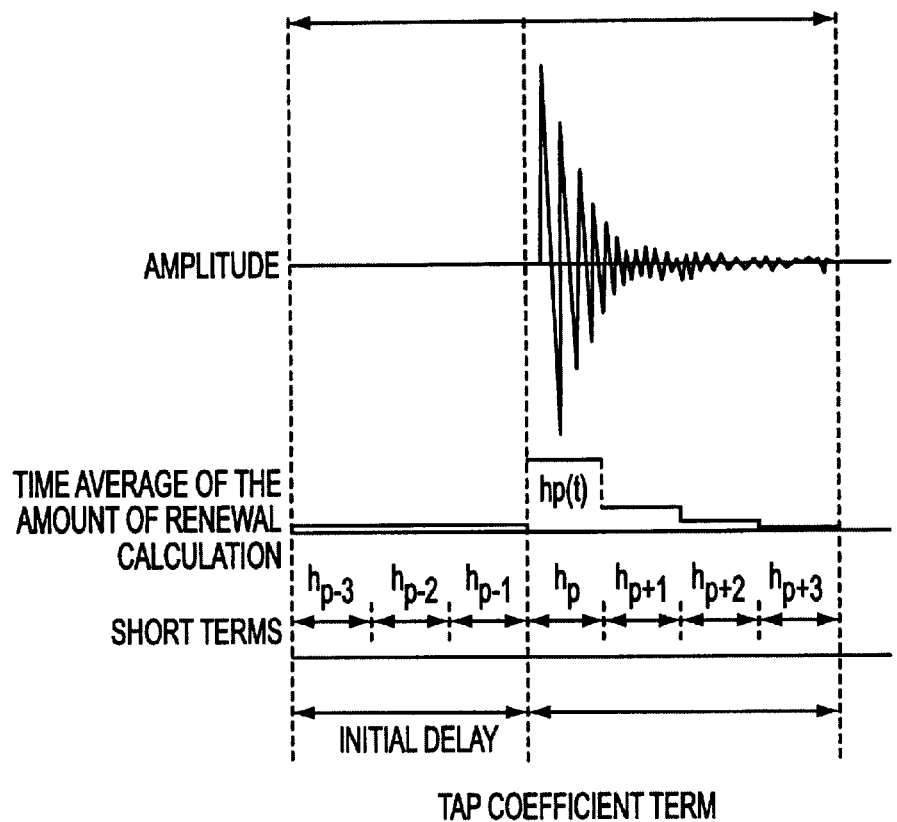
FIG. 5 is a graph showing a relationship between an impulse response and renewal amount average of tap coefficients according to the second embodiment of the invention.

FIG. 4 shows an echo canceller according to a second embodiment of the invention. FIG. 5 is a graph showing a relationship between an impulse response and a time average of a renewal amount of tap coefficients. The echo canceller includes a far-end input terminal 101, an adaptive filter 102, a near-end output terminal 103, an echo path 104, a near-end sound source 105, a near-end input terminal 106, an adder 107, an initial operation controller 208, a renewal amount calculator 209, a renewal controller 210 and a far-end output terminal 110. A normalized least-mean-squares algorithm is used for the echo canceller according to the second embodiment as the adaptive algorithm.

In the second embodiment, as shown in FIG. 5, the tap coefficients are divided into several short terms (e.g., $h_{p-3}$, $h_{p-2}$, $h_{p-1}$, $h_p$, $h_{p+1}$, $h_{p+2}$, and $h_{p+3}$,) where each short term has the same number k of tap coefficients. The initial delay is determined based on the time average for each renewal amount of the tap coefficients in each short term. Here, the time average for each renewal amount of the tap coefficients is determined as in equation (5) above. A summed time average for each short term is determined by summing the time averages for the renewal amounts in each short term. The initial delay is determined by comparing the summed time averages.

The echo canceller performs (1) an tinital operation for detecting the initial delay and (2) the echo cancel operation for removing the echo signal (ET) from the near-end signal (Sin') as discussed next.

(1) Initial Operation

Figure 6:
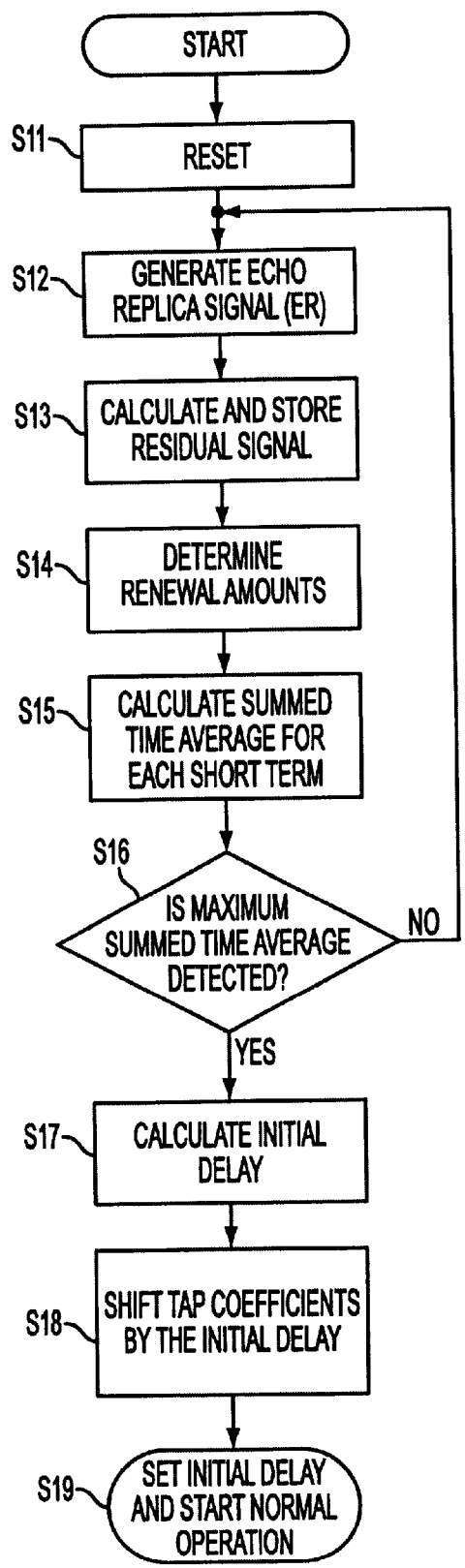
FIG. 6 is a flow chart showing an initial operation of the echo canceller according to the second embodiment of the invention.

FIG. 6 is a flow chart showing the initial operation of the echo canceller according to the second embodiment. The initial operation controller 208 receives a far-end input signal (Rin) and a near-end signal (Sin') and then starts the initial operation based on a predetermined criterion. Here, the predetermined criterion is the same as the first embodiment, that is, the average energy of the near-end signals (Sin') is lower than the first threshold level, and the average energy of the far-end input signals (Rin) is higher than the second threshold level.

First, the adaptive filter 102 resets tap coefficients and the amount of an initial delay of an impulse response, and the renewal amount calculator 209 resets the data regarding the initial delay (STEP S11). The adaptive filter 102 generates an echo replica signal (ER) based on the tap coefficients h(t) of an impulse of time t and the far-end input signal (Rin) (STEP S12).

The echo replica signal (ER) is calculated by the above equation (1), where $h(t)^T=[h_{p-r}, h_{p-r+1}, \ldots, h_p, \ldots, h_{p+q-1}, h_{p+q},]$ and each $h_s$ for p−r$\geq$s$\geq$p+q is a vector of an identical number of tap coefficients for r+q+1 short terms.

The adder 207 subtracts the echo replica signal (ER) from the near-end signal (Sin'(=y(t))). That is, a residual signal (ZS(=e(t))) is calculated by performing the above equation (2) (STEP S13).

The adaptive filter 102 renews tap coefficients based on the residual signal (ZS) such that the amplitude of the residual signal (ZS) is zero. The adaptive filter 102 also calculates each renewal amount of the tap coefficients (STEP S14). The renewal operation of the tap coefficients is performed based on the above equation (3).

The renewal amount ($\delta$h(t) of the tap coefficients is calculated based on the above equation (4) and is provided to the renewal amount calculator 209. The initial delay is determined based on the time average for each the renewal amount of the tap coefficients in each short term. Here, the time average for each renewal amount of the tap coefficients is determined as in equation (5) above. A summed time average for each short term is determined by summing the time averages for the renewal amounts in each short term (STEP S15).

The renewal controller 210 receives the summed time averages from the renewal amount calculator 209. The renewal amount calculator 209 examines the summed time average of each short term and detects a particular short term $h_p$ having a summed time average that is larger than the summed time average of the previous short term $h_{p-1}$ (STEP S16). This detection of the particular short term is further explained with reference to FIG. 5.

As shown in FIG. 5, the impulse response of the echo path has the following features: (1) a very small amplitude during the initial delay; (2) a maximum amplitude appearing after the initial delay; and (3) an amplitude exponentially attenuating after the maximum amplitude. That is, the renewal amount of the tap coefficients becomes a maximum value at the maximum amplitude of the impulse response. For this reason, the summed time average for the renewal amounts corresponding to the K tap coefficients in each short term is a small value during the initial delay (e.g., short terms $h_{p-3}$ to $h_{p-1}$) and has a maximum value at the maximum amplitude of the impulse response (e.g., short term $h_p$). In this case, the summed time average for each short term is used to detect the particular short term ($h_p$) corresponding to the maximum amplitude of the impulse response. In particular, by summing the time averages for each short term, a difference between the summed time average corresponding to the initial delay and the summed time average corresponding to the maximum amplitude of the impulse response is apparent.

If the time average of the particular short term ($h_p$) does not exceed a predetermined threshold, the steps S12 to S16 are repeatedly performed until the particular short term ($h_p$) can be detected.

The renewal calculator 210 provides the amount of the initial delay (e.g., short terms $h_{p-3}$ to $h_{p-1}$ as in FIG. 5) to the initial operation controller 208. The initial operation controller 208 calculates the initial delay (d=r*k), where (r) is the number of the short terms occurring prior to the detected short term $h_p$, and K is the number of the taps in each short term (STEP S17).

The adaptive filter 102 eliminates the d tap coefficients corresponding to the short terms occurring prior to the detected short term $h_p$, namely short terms $h_{p-r}, h_{p-r+1}, \ldots, h_{p-1}$. The remaining tap coefficients are shifted in response to the elimination of the d tap coefficients as in the first embodiment (STEP S18).

After determining the initial delay, the adaptive filter 102 performs a normal operation (STEP S19).

(1) Normal Operation

The adaptive filter 102 calculates and generates the echo replica signal (ER) based on the tap coefficients h(t) of the impulse response of time t and the far-end input signal (Rin). Suppose that the initial delay is d=(p-1)*k, the adaptive filter 102 calculates the echo replica signal (ER) without using the tap coefficients corresponding to the initial delay d.

Thus, the echo replica signal (ER) is calculated based on the above equation (6).

The residual signal (ZS=e(t)) is generated by subtracting the echo replica signal (ER) from the near-end input signal (Sin'(=y(t))) as in the above equation (7).

The adaptive filter 102 renews the tap coefficients based on the residual signal (ZS). The renewal of the tap coefficients is performed based on the above equation (8).

Thus, the residual signal (ER) is output from the far-end output terminal 110 as a far-end output signal (Sout).

The adaptive filter 102 repeatedly performs the above mentioned normal operation for every near-end input signal (Sin) as a one cycle operation. If the initial operation controller 208 detects a change in the amount of the initial delay, the adaptive filter 102 performs the initial operation prior to performing another normal operation.

According to the second embodiment of the invention, the amount of the initial delay is determined based on the summed time average for each short term. Accordingly, the echo canceller according to the second embodiment can correctly detect the initial delay. In addition, the adaptive filter 102 does not need to calculate the tap coefficients corresponding to the initial delay.

Alternatively, the eliminated tap coefficients (n−m−1) corresponding to the initial delay can be used and are assigned values corresponding to an end portion of the impulse response such that all N tap coefficients of the adaptive filter 102 are used.

C. Third Embodiment of the Invention

Figure 7:
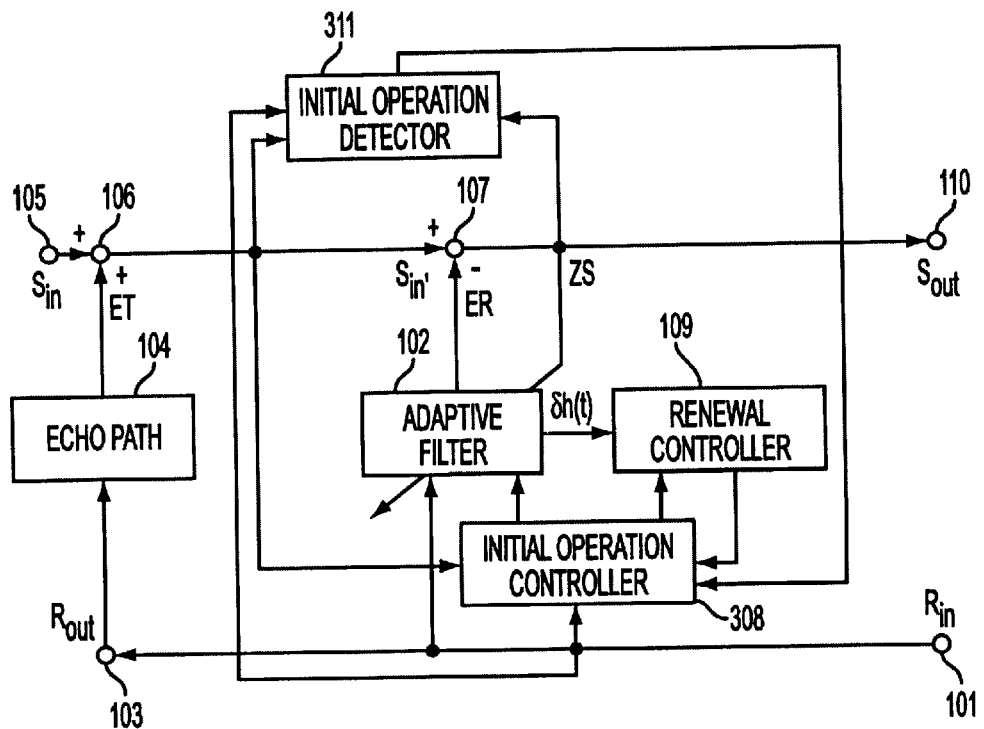
FIG. 7 is a block diagram showing an echo canceller according to a third embodiment of the invention.

FIG. 7 shows an echo canceller according to a third embodiment of the invention. The echo canceller includes a far-end input terminal 101, an adaptive filter 102, a near-end output terminal 103, an echo path 104, a near-end sound source 105, a near-end input terminal 106, an adder 107, an initial operation controller 308, a renewal controller 109, a far-end output terminal 110 and an initial operation detector 311. A normalized least-means-square algorithm is used in the echo canceller according to the third embodiment as the adaptive algorithm.

In the third embodiment, a required initializing condition for performing the initial operation is added to the first embodiment. The required initializing condition is detected by the initial operation detector 311. The initial operation detector 311 then performs an initial operation based on a far-end input signal (Rin), a near-end input signal (Sin') and a residual signal (ZS). The initial operation detector 311 compares the power of the near-end input signal (Sin') with the power of the residual signal (ZS). When the power of the residual signal (ZS) is larger than the power of the near-end input signal (Sin'), the initial operation detector 311 directs the initial operation controller 308 to begin the initial operation.

The initial operation controller 308 performs the same initial operation as the initial operation controller 108 in the first embodiment, except in response to the direction of the initial operation detector 311. After the initial operation is performed, the same normal operation as in the first embodiment is performed. However, in this embodiment, the initial operation detector 311 detects the change in the amount of the initial delay based on the far-end input signal (Rin), the near-end input signal (Sin') and the residual signal (ZS) instead of the initial operation controller 108 as in the first embodiment.

According to the third embodiment, the required condition for performing the initial operation can be detected easily by comparing the power of the near-end input signal (Sin') with the power of the residual signal (ZS).

D. Fourth Embodiment of the Invention

Figure 8:
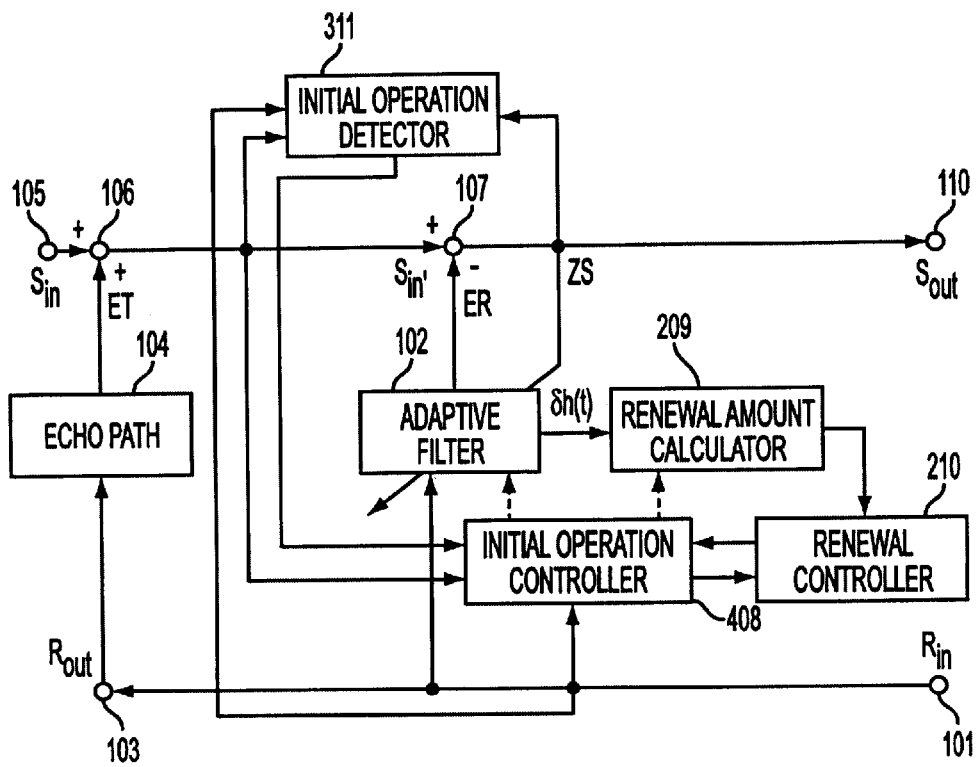
FIG. 8 is a block diagram showing an echo canceller according to a fourth embodiment of the invention.

FIG. 8 shows an echo canceller according to a fourth embodiment of the invention. The echo canceller includes a far-end input terminal 101, an adaptive filter 102, a near-end output terminal 103, an echo path 104, a near-end sound source 105, a near-end input terminal 106, an adder 107, an initial operation controller 408, a renewal amount calculator 209, a far-end output terminal 110, a renewal controller 210 and an initial operation detector 311. A normalized least-mean-squares algorithm is used in the echo canceller according to the third embodiment as the adaptive algorithm.

In the fourth embodiment, a required initializing condition for performing the initial operation is added to the second embodiment. The required initializing condition is detected by the initial operation detector 311. The initial operation detector 311 then performs an initial operation based on a far-end input signal (Rin), a near-end input signal (Sin') and a residual signal (ZS). The initial operation detector 311 compares the power of the near-end input signal with the power of the residual signal (ZS). When power of the residual signal (ZS) is larger than power of the near-end input signal (Sin'), the initial operation detector 311 directs the initial operation controller 408 to begin the initial operation.

The initial operation controller 408 performs the same initial operation as the initial operation controller 208 in the second embodiment, expect in response to the direction of the initial operation detector 311. After the initial operation is performed, the same normal operation as in the second embodiment is performed. However, in this embodiment, the initial operation detector 311 detects the change in the amount of the initial delay based on the far-end input signal (Rin), the near-end input signal (Sin') and the residual signal (ZS) instead of the initial operation controller 208 as in the second embodiment.

According to the fourth embodiment, the required condition for performing the initial operation can be detected easily by comparing the power of the near-end input signal (Sin') with the power of the residual signal (ZS).

The invention can be implemented in software, hardware, or combination of software and hardware as one skilled in the art will recognize. For use with a hands free telephone, the invention can be implemented, for example with a microprocessor and software stored in memory.

The invention has been described using discrete-time signals and can be likewise implemented using continuous-time signals.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. An echo canceller having an adaptive algorithm for canceling an echo signal, comprising:
    an adaptive filter for generating a pseudo-echo signal by renewing tap coefficients based on a far-end input signal, a near-end input signal and a residual signal,
    a renewal controller for determining a time average of a renewal amount for each tap coefficient and for estimating an initial delay of the echo signal by selecting the time average having a maximum renewal amount, said renewal controller receiving information on the tap coefficients from the adaptive filter,
    an initial operation controller for operating said adaptive filter to perform an initial operation to eliminate the tap coefficients corresponding to the initial delay of the echo signal and to renew the remaining tap coefficients corresponding to the echo signal,
    wherein said adaptive filter generates the pseudo-echo signal based on the remaining tap coefficients.

2. An echo canceller according to claim 1, wherein the time average for each tap coefficient is determined by summing previous renewal amounts for each tap coefficient.

3. An echo canceller according to claim 1, wherein the time average for each tap coefficients is determined by squaring current and previous renewal amounts for each tap coefficient to obtain squared renewal amounts and summing the squared renewal amounts.

4. An echo canceller according to claim 1, further comprising an initial operation detector for operating said initial operation controller to begin the initial operation, wherein when the initial operation detector detects that a power of the near-end input signal is larger than a power of the residual signal, a power of the far-end input signal is higher than a predetermined first threshold level and a power of the near-end input signal is lower than a predetermined second threshold level.

5. An echo canceller according to claim 1, wherein the initial operation controller eliminates the tap coefficients and renews the remaining tap coefficients when a power of the far-end input signal is higher than a predetermined first threshold level and a power of the near-end input signal is lower than a predetermined second threshold level.

6. An echo canceller according to claim 5, wherein the predetermined first threshold level is −45 dBm0, and the predetermined second threshold level is −45 dBm0.

7. An echo canceller having an adaptive algorithm for canceling an echo signal, comprising:
    an adaptive filter for generating a pseudo-echo signal by renewing tap coefficients based on a far-end input signal, a near-end input signal and residual signal,
    a renewal amount calculator for calculating a time average of a renewal amount for each tap coefficient and for summing the time averages for the tap coefficients in each short term to obtain a summed time average for each short term, each short term having a predetermined number of top coefficients, said renewal controller receiving information on the tap coefficients from the adaptive filter,
    a renewal controller for estimating an initial delay of the echo signal by selecting the short term having a maximum summed time average as a maximum short term and determining the initial delay based on a number of short terms occurring prior to the maximum short term,
    an initial operation controller for operating said adaptive filter to perform an initial operation to eliminate the tap coefficients corresponding to the initial delay and to renew the remaining tap coefficients corresponding to the echo signal,
    wherein said adaptive filter generates the pseudo-echo signal based on the remaining tap coefficients.

8. An echo canceller according to claim 7, wherein the time average for each top coefficient is determined by summing previous renewal amounts for each tap coefficient.

9. An echo canceller according to claim 7, wherein the time average for each tap coefficient is determined by squaring current and previous renewal amounts for each tap coefficient to obtain squared renewal amounts and summing the squared renewal amounts.

10. An echo canceller according to claim 7, further comprising an initial operation detector for operating said initial operation controller to begin the initial operation, wherein when the initial operation detector detects that a power of the near-end input signal is larger than a power of the residual signal, a power of the far-end input signal is higher than a predetermined first threshold level and a power of the near-end input signal is lower than a predetermined second threshold level.

11. An echo canceller according to claim 7, wherein the initial operation controller eliminates the tap coefficients and renews the remaining tap coefficients when a power of the far-end input signal is higher than a predetermined first threshold level and a power of the near-end input signal is lower than a predetermined second threshold level.

12. An echo canceller according to claim 11, wherein, the predetermined first threshold level is −45 dBm0, and the predetermined second threshold level is −45 dBm0.

13. A method of canceling an echo signal, comprising steps of:
    generating a pseudo-echo signal by renewing tap coefficients based on a far-end input signal, a near-end input signal and residual signal,
    calculating a renewal amount for each tap coefficient,
    selecting a maximum renewal amount, and
    eliminating tap coefficients based on the maximum renewal amount,
    wherein the pseudo-echo signal is generated using the remaining tap coefficients.

14. A method according to claim 13, further comprising the step of determining a time average of the renewal amount for each tap coefficient, wherein the maximum renewal amount is selected by comparing the time averages.

15. A method according to claim 13, further comprising the steps of selecting the tap coefficients into short terms, determining a time average of the renewal amount for each tap coefficient and summing the time averages for the tap coefficients in each short term to obtain summed time averages, wherein the maximum renewal amount is selected by comparing the summed time averages.

16. A method according to claim 13, wherein the step of eliminating top coefficients occurs when a power of the near-end input signal is larger than a power of the residual signal, a power of the far-end input signal is higher than a predetermined first threshold level and a power of the near-end input signal is lower than a predetermined second threshold level.

* * * * *